March 30, 1943.                J. L. MATTHEWS                2,315,068
                              CONVEX FACED GEAR
                             Filed Aug. 28, 1939
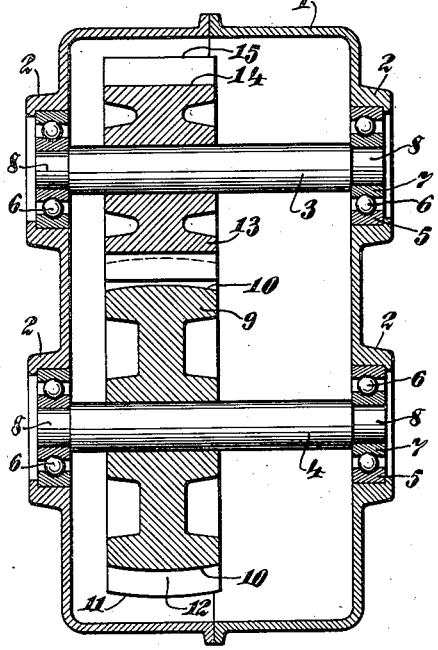
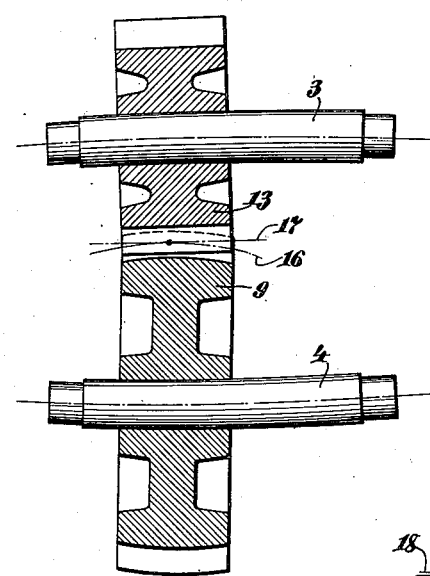
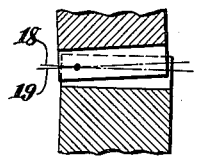
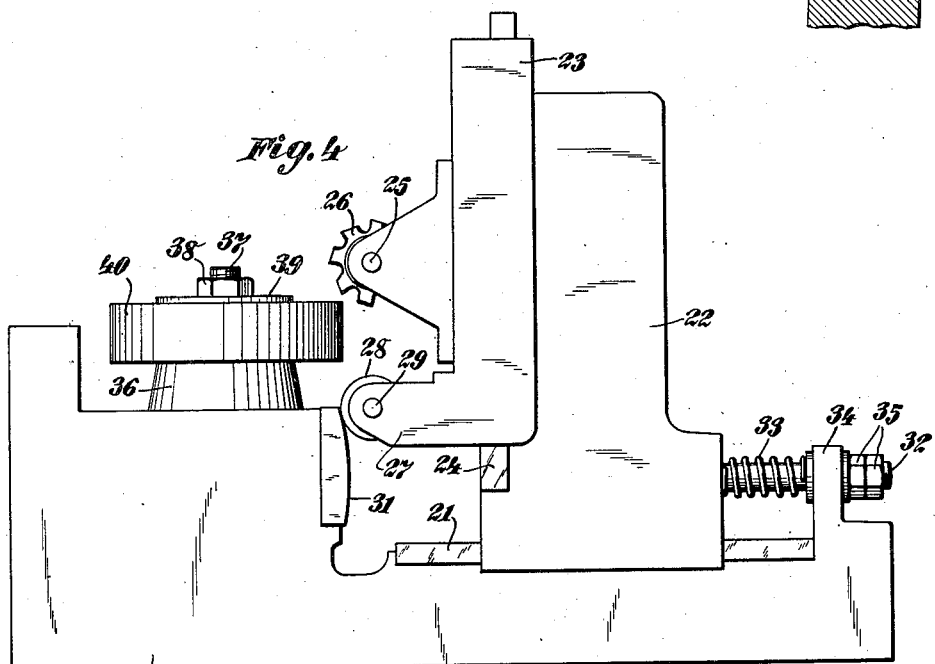
INVENTOR.
Joseph L. Matthews,
BY Hoguet, Neary & Campbell
ATTORNEYS Patented Mar. 30, 1943

2,315,068

UNITED STATES PATENT OFFICE 2,315,068

CONVEX FACED GEAR

Joseph L. Matthews, Highland Park, N. J., assignor to Mack Manufacturing Corporation, Long Island City, N. Y., a corporation of Delaware Application August 28, 1939, Serial No. 292,181

6 Claims. (Cl. 74—462)

The present invention relates to gear mechanisms and more particularly to an improved gear construction adapted to be used in mechanisms of the fixed shaft type, and method and apparatus for making same.

In accordance with the usual practice, gears are generally formed in such a manner that the teeth and outer face thereof are substantially straight and parallel to the axis of the gear. I have found from experience that gear mechanisms employing gears cut in this fashion frequently break under loads which are less than the theoretical capacity of the gears, and that such mechanisms tend to be noisy in operation, particularly when under strain. This has indicated to me that under the usual conditions of operation, and particularly under load, an improper meshing of the gear teeth occurs due to faulty installation of the gears or to distortion of the supporting shaft under load.

It will be observed that gear teeth are inherently stronger at their central portions, and that an improper meshing of the gears causing the driving force to act upon an off-center portion substantially decreases the load capacity of the gear. Such improper meshing of the gears, besides decreasing the load capacity of the mechanism and causing the same to be noisy in operation, also causes the surfaces of the teeth to become worn unevenly, and to a greater extent than normally with the result that the mechanism wears out rapidly and requires frequent replacement.

I have observed, moreover, that in the assembling of mechanisms utilizing gears of the straight cut type it is difficult to avoid small errors in alignment of the gears which result in noisy operation and a decrease in the load capacity thereof.

It is an object of my invention, therefore, to provide a gear mechanism in which the gears are so formed that under ordinary operating conditions the load applied thereto will be distributed substantially at the center of the gear teeth surfaces, with the result that breakage of the gear or gear teeth will be effectively avoided.

Another object of my invention is to provide a gear cut in such a manner that it may be used with greater facility in mechanisms of the fixed shaft type making it unnecessary to avoid slight errors in alignment.

A further object of my invention is to provide an improved gear mechanism which is characterized by more quiet operation and freedom from vibration.

Yet a further object of my invention is to provide an apparatus and method for manufacturing gears having the above-described improved characteristics, so that my invention may be practiced in a convenient and economical fashion.

The accomplishment of the objects of my invention will be understood from the following description, taken in connection with the accompanying drawing, in which:

Figure 1 is a cross-sectional view of a gear mechanism assembled in accordance with my invention;

Figure 2 is a similar view of a portion of the assembled gear mechanism showing the operation of the gears when the shafts are distorted under load;

Figure 3 is a partial view in cross-section showing the meshing of the gears cut in the usual straight manner and being operated under a distorting load; and Figure 4 is a front view of a gear cutting apparatus which may be used to manufacture gears in accordance with my invention.

Referring to Figure 1, a gear mechanism is shown comprising a housing 1, formed with shoulders 2 adapted to position shafts 3 and 4 in relatively fixed relationship by means of ball bearings comprising outer races 5, bearings 6, and inner races 7 secured to the ends 8 of the shafts 3 and 4. A bull gear 9 is fixed on shaft 4, such as by splining, in such a manner that it is in substantial alignment and meshed with mating gear 13 which is secured to shaft 3. The bull gear 9 is formed with a convex face 10 and tooth edges 11 which give the gear a greater diameter at the central portion and cause the same to operate in an improved fashion as will be described hereinafter. For convenience, the gear is cut with equal tooth spaces of uniform width. The crown of the teeth surfaces is preferably between .001 inch and .0003 inch per inch of face width of the gear inasmuch as for values less than .0003 the beneficial results are not commensurate with the costs of manufacture and for values greater than .001 the load capacity of the gear is necessarily lowered. For example, a 3 inch gear formed in accordance with my invention would preferably have a crown of about .002 inch. This is approximately .0007 inch per inch of gear face width or about .07%. The outer face 14 and the edge 15 of the mating gear 13 are cut in the usual manner, e. g. in a straight line, parallel to the axis of the gear hereinafter referred to as the running pitch line. It will be apparent that if desired gear 13 may be formed with convex surfaces, as described in connection with bull gear 9, but in view of the slight crown contemplated in my invention, it is usually desirable to cut only one of the gears with convex surfaces.

Referring to Figure 2, the meshing of the gears under load tends to distort the shafts 3 and 4 in opposite directions, so that gears 13 and 9 are slightly out of alignment. By reason of the convex facing on bull gear 9, the center of force remains substantially at the center of the teeth area, as shown by the intersection of dot and dash lines 16 and 17. Line 16 may conveniently be referred to as the generating path line. It is understood that the acting force is not confined to one point but is distributed over a considerable area. This may be compared with the similar diagram in Figure 3, which shows that with ordinary gears, both of which are formed with straight cut teeth, the center of force when the mechanism is under strain is located at the edges of the gear surfaces, as shown by the intersection of dot and dash lines 18 and 19. By reason of the fact that the meshing of gears cut in the usual manner is operable only at the corners of the gear teeth when the gears are out of alignment, whether such improper meshing is due to faulty assembly or because of load stresses, the capacity of the gears is frequently exceeded and breakage is not uncommon.

This above-described off-center meshing also causes the operation of ordinary gears to become extremely noisy, and therefore undesirable in many uses. Furthermore, wearing of the gears is increased and is not uniform with the result that frequent replacements of the same are necessary.

Although I have described my invention particularly with respect to spur gears, it will be apparent that the same is applicable to any gear such as beveled, helical, herring bone, etc., which when used in mechanisms of the fixed shaft type will be subjected to off-center loads due to faulty installation or distortion of the shafts.

A conventional gear, e. g. one having straight edges, may be suitably crowned by shaving or hand finishing, but this is usually a slow and expensive process. Referring to Figure 4, an apparatus which may be used to cut gear blanks in accordance with my invention, comprises a base 20, formed with bed ways 21, on which a horizontally movable stanchion 22 is adapted to slide. The stanchion 22 is formed with a head 23 adapted to move vertically on stanchion ways 24. On the vertically movable head 23 is mounted a hob spindle 25 for supporting a cutting hob 26, which may be driven by any suitable means (not shown in the drawing). The head 23 is formed with an extension 27 having a roller 28 mounted thereon by means of a spindle 29, said spindle 29 being fixed in relation to the hob spindle 25. The roller 28 is adapted to move against a cam surface 31, which is rigidly supported vertically on the base 20. The stanchion 22 is provided with a bolt 32 and a spring member 33 which cooperate with an extension 34 on the base 20 to urge the roller 28 against the cam surface 31, by exerting a horizontal force upon the stanchion 22.

A plurality of nuts 35 are provided on bolt 32 to limit the horizontal movement of the stanchion 22 when roller 28 is moved vertically out of contact with cam 31.

It will be apparent that as the head 23 moves vertically the hob 26 will follow a curved path hereinafter referred to as the generating path line identical to that of the cam surface 31. A mounting base 36 provided with a bolt 37, nut 38 and washer 39 is adapted to hold a gear blank 40 with its axis parallel to the path of the head 23. In the operation of the mechanism, the curved path of the hob 26 moving downwardly through the gear blank 40 acts to cut the gear blank with teeth having an active profile nearer to the axis of the gear at the sides of the gear than at the center. Each vertical movement of the hob 26 is in a radial plane of the gear so that the thickness of any tooth when measured along an arcuate cutting line or generating path line is of equal thickness throughout the entire width of the gear. In a conventional manner, however, each tooth is cut throughout the entire width of the gear with a progressively greater cross-section from tooth tip to tooth base to form, for example, an involute profile. As a result, the portions of a tooth at equal distances from the axis of the gear are of larger cross-section at the center of the gear than at the sides of the gear. Accordingly, when measured along a line parallel to the axis of the gear, i. e., a running pitch line, each tooth is of greater thickness at the center than at the sides of the gear and decreases outwardly to form the desired crown or convex surface.

If desired, the above apparatus may be modified by permitting the hob 26 to travel in a straight vertical line, as is usually the case in apparatus of this type, and by providing means for moving the base 36 in relation to the movement of the head 23. It will also be apparent that although I have described my apparatus, for convenience, as one in which the head moves vertically, the same will operate equally satisfactorily in any other plane.

It is the usual practice, and practically a necessity from a manufacturing standpoint, to cut the gear teeth before the gear blank has been hardened by heating and quenching in the usual manner. I have observed that gear blanks which have been cut in a straight line, particularly large gears, will, upon heating and quenching acquire a concave face which accentuates the inherent disadvantages described above in connection with straight cut gears. Furthermore, this change on hardening is generally not uniform and may vary at the center from about .0005 inch to .001 inch per inch of gear face width. In accordance with my invention, the teeth of the gear are preferably cut with a crown in excess of that desired in the finished gear, so that after distortion by quenching, the crown of the convex facing will be no greater than approximately .001 inch per inch of gear face width. It will be apparent, for example, that if the gears are cut with a crown of approximately .0006 inch per inch of gear face width which would be satisfactory in a finished gear in accordance with my invention, after heat treatment some of the gears will have a convex face and others will be concave. I prefer, therefore, to cut the face and teeth of the gear with a crown which is approximately 100% greater than the preferred or 50% greater than the highest desirable value for the crown in the finished gear. As a general rule, cutting the gears with a crown of about .0015 inch per inch of gear face width will give satisfactory results, inasmuch as after quenching the preferred limits will be met.

I am aware that heretofore gears have been formed with curved faces to permit utilization of the gears with shafts which are adapted to be moved relatively to each other. In gears of this type, meshing of the teeth takes place at only a small portion of the teeth surface, regardless of the position of the gears. In my invention, it is contemplated that the shafts are fixed in spaced relationship, and it is desired to accomplish meshing of the teeth over a maximum of tooth surface under all conditions of operation. This may be accomplished satisfactorily if the crown of the gear is not substantially more than .001 inch per inch of gear face width. It will be apparent that the extreme type of curved surfaces would be ineffective for the purposes of my invention because the load would be effective over a small area, and the capacity of the gears, therefore, would be greatly curtailed.

It is understood that all variations of my invention, which will be apparent to one skilled in the art, are intended to be included within the scope of the following claims.

I claim:

1. A gear adapted to be supported on a shaft in substantial alignment with a mating gear supported on a second shaft which is in substantially fixed space relationship with respect to the first shaft, said first named gear being formed with teeth decreasing in thickness fom base to tip and of uniform thickness on a curved generating path line and of non-uniform thickness on a running pitch line such that the tooth thickness on said running pitch line decreases from the center outwardly to form a crown for providing a greater amount of tooth contact when said gears are deflected from true alignment than would be provided by a straight cut gear under similar conditions of operation.

2. A gear for mechanisms having shafts in fixed space relationship, said gear being formed with teeth of uniform thickness on a generating path line and of non-uniform thickness on a running pitch line such that the tooth thickness on said running pitch line decreases from the center outwardly to form a crown, the amount of said crown being not substantially more than 0.15% of the width of the gear.

3. A gear for mechanisms having shafts in fixed space relationship, said gear being formed with teeth of uniform thickness on a generating path line and of non-uniform thickness on a running pitch line, such that the tooth thickness on said running pitch line decreases from the center outwardly to form a crown, the amount of said crown being substantially from .03% to 0.1% of the width of the gear.

4. A gear mechanism comprising a plurality of shafts, mating gears on said shaft and means for supporting said shafts in fixed space relationship with the mating gears in mesh, at least one of said gears being formed with teeth decreasing in thickness from base to tip and of uniform thickness on a curved generating path line and of non-uniform thickness on a running pitch line such that the tooth thickness on said running pitch line decreases from the center outwardly to form a crown for providing a greater amount of tooth contact when said gears are deflected from the true alignment than would be provided with a straight cut gear under similar conditions of operation.

5. A gear mechanism comprising a plurality of shafts, mating gears on said shaft and means for supporting said shafts in fixed space relationship with the mating gears in mesh, at least one of said gears being formed with teeth of uniform thickness on a generating path line and of non-uniform thickness on a running pitch line such that the tooth thickness on said running pitch line decreases from the center outwardly to form a crown, the amount of said crown being not substantially more than 0.1% of the width of the gear.

6. A gear mechanism comprising a plurality of shafts, mating gears on said shaft and means for supporting said shafts in fixed space relationship with the mating gears in mesh, at least one of said gears being formed with teeth of uniform thickness on a generating path line and of non-uniform thickness on a running pitch line such that the tooth thickness on said running pitch line decreases from the center outwardly to form a crown, said crown being substantially from 0.03% to 0.15% of the width of the gear.

JOSEPH L. MATTHEWS.